Oct. 1, 1935.  H. A. KNOX ET AL  2,015,683
TRACK FOR TRACKLAYING VEHICLES
Filed Sept. 15, 1933  2 Sheets-Sheet 2
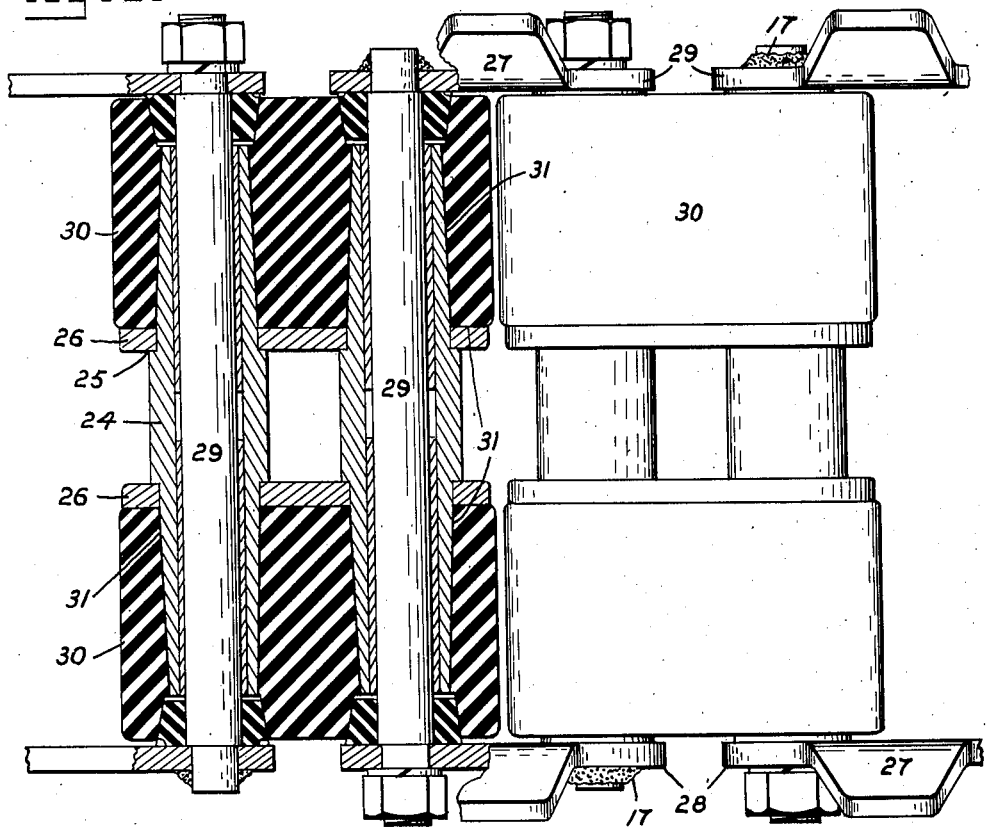
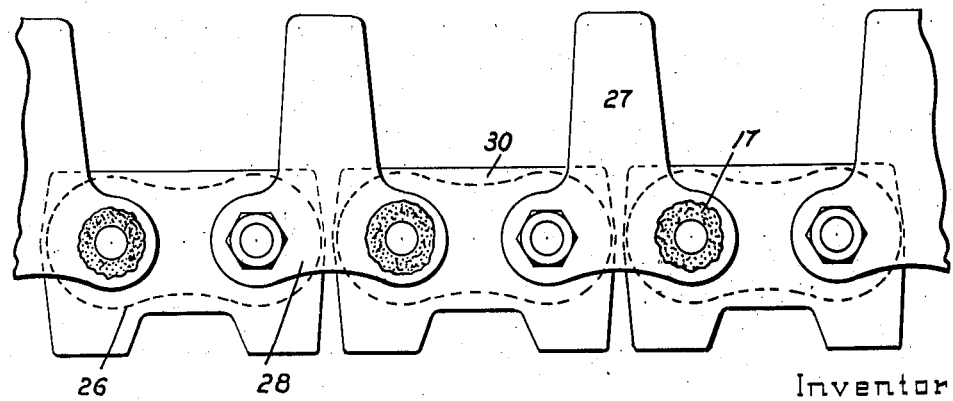
Inventors
Harry A. Knox
Charles Hiller, Jr
By W. N. Roach
Attorney Patented Oct. 1, 1935

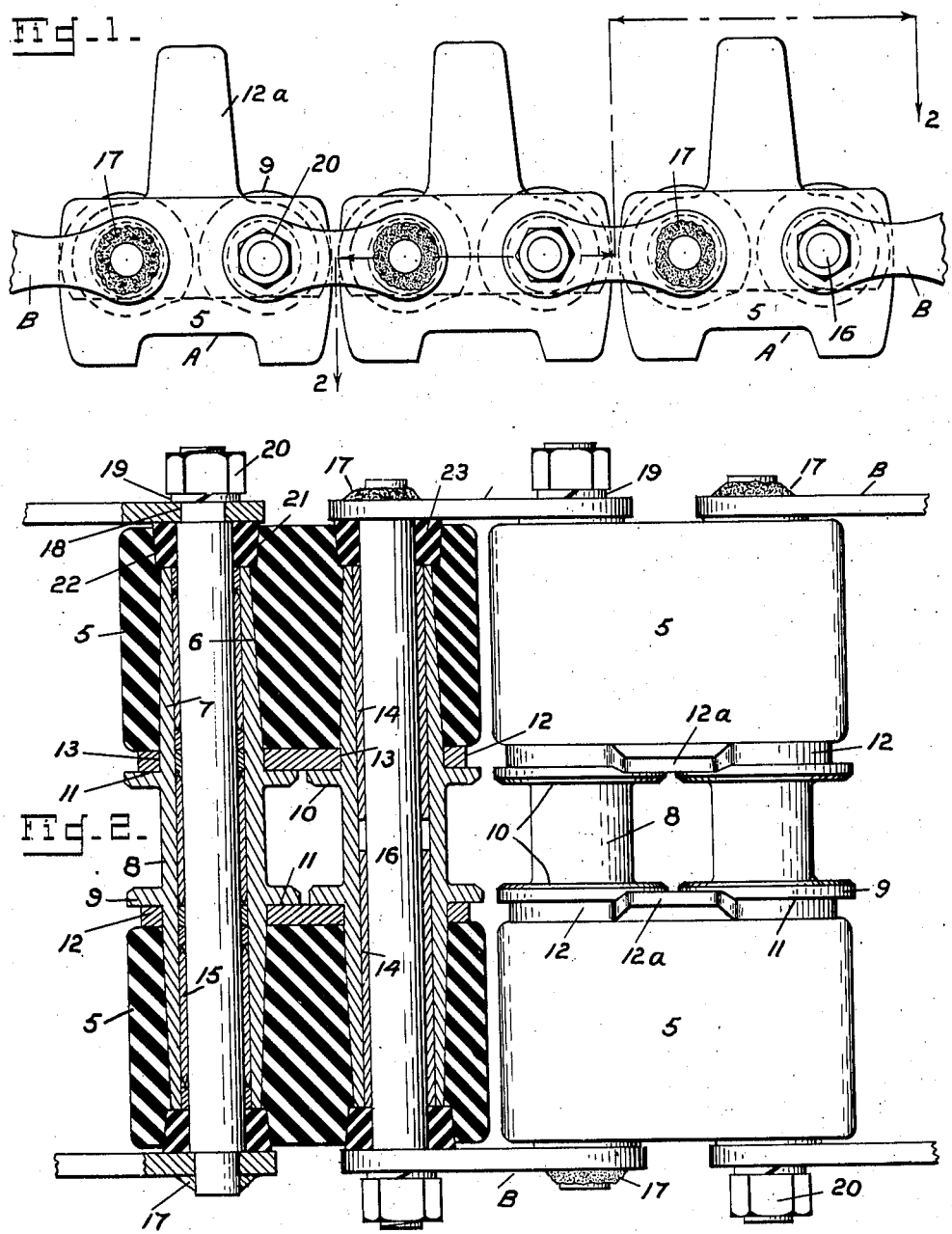

2,015,683

UNITED STATES PATENT OFFICE 2,015,683

TRACK FOR TRACKLAYING VEHICLES

Harry A. Knox, Davenport, Iowa, and Charles Hiller, Jr., St. Louis, Mo.

Application September 15, 1933, Serial No. 689,598

6 Claims. (Cl. 305—10)

(Granted under the act of March 3, 1883, as amended April 30, 1928; 370 O. G. 757)

The invention described herein may be manufactured and used by or for the Government for governmental purposes without the payment to us of any royalty thereon.

This invention relates to a track for track-laying vehicles.

The purpose of this invention is to provide a jointed link track which will be of light weight, have great strength and be capable of extended use without replacement of parts.

The track is characterized by a novel mounting of rubber blocks or shoes on a rigid frame to form a track section and adjacent frames are connected by a rigid arrangement of adjacent links and link pins.

To these and other ends, the invention consists in the construction, arrangement and combination of elements described hereinafter and pointed out in the claims forming a part of this specification.

A practical embodiment of the invention is illustrated in the accompanying drawings, wherein:

Fig. 1 is a view in side elevation of a portion of a track constructed in accordance with the invention.

Fig. 2 is a detail view on the line 2—2 of Fig. 1.

Fig. 3 is a view similar to Fig. 2 showing a modification of the track.

Fig. 4 is a view in side elevation of Fig. 3.

Referring to Figs. 1 and 2 the track is formed of a series of similar track sections A—A connected in spaced relation by means of links B.

Each track section comprises a pair of blocks 5—5 of resilient material, such as rubber. The inner sides of the blocks form rails for the wheels of the vehicle while the outer sides are adapted to provide a traction surface for engaging the ground. The blocks 5—5 are each provided with two tapered apertures 6—6 whereby they are easily and slidably mounted on a pair of double tapered sleeves 7—7 forming a part of a rigid frame.

The central portion 8 of each sleeve 7 is preferably cylindrical and constitutes a pin for engaging the teeth of a sprocket wheel. The portion 8 is formed with spaced annular flanges 9—9 whose inner faces 10 form guides for the sprocket wheel and whose outer faces 11 establish seats for rigid metallic plates 12—12 completing the frame and including wheel guides 12a. Each plate 12 is formed with a pair of apertures 13 whereby it is mounted on the pair of sleeves 7—7 with a heavy press-fit. The plates 12—12 serve to rigidly connect the sleeves 7—7 of a track section.

Within each sleeve is a bearing which in the case of the right hand sleeve of Fig. 2 consists of oilless bronze bushings 14—14 and in the left hand sleeve consists of needle bearings 15—15. Both types of bearings are of well known commercial forms and may be interchangeably employed.

A link pin 16 passes through the bearings in each sleeve. Each link pin has a link B fixed to one of its ends as indicated at 17 by welding. The free end of the link B is provided with an aperture 18 whereby it may be assembled to the free end of a similar link pin 16 of an adjacent track section and retained thereon by a washer 19 and nut 20. When the similar adjacent link pins of adjacent sections are connected they provide a rigid assembly on which the track sections are mounted for independent pivotal movement.

The sleeve 7 and bearings 14 or 15 are terminated short of the outer sides of the rubber blocks 5. The apertures 6 in the blocks 5 are each counterbored to form recesses 21 with outwardly flared side walls 22. A tapered plug 23 is press-fitted in each recess 21 and embraces the link pin 16. The plugs are held in place by the links B and provide seals to prevent the entrance of foreign matter into the bearings.

The pair of sleeves 7—7 of each track section, rigidly connected by the plates 12—12, serve as reinforcements for the rubber blocks 5 and prevent the blocks from flexing. The pull of the track is transmitted by the rigid links B from the sleeves of one track section to the sleeves of an adjoining track section, and as a consequence there will be no elongation or stretching of the rubber blocks. When the track sections are flexed relative to one another all of the wear is taken by the bearings 14 and 15 and the link pins 16.

All of the parts entering into the formation of the track may be readily replaced.

In the modification shown in Figs. 3 and 4 the sleeves 24 are provided centrally with spaced annular shoulders 25—25 for seating rigid metallic plates 26 connecting the sleeves 24. Wheel guides 27 are integral with links 28 connecting the link pins 29—29 of adjacent track sections.

Rubber blocks 30 similar to the blocks 5 of Figs. 1 and 2 are preferably cemented on the sleeves 24 as indicated at 31.

We claim:

1. A track for track-laying vehicles comprising articulated sections, each section consisting of a pair of sleeves, each sleeve having spaced flanges on its center portion and having tapered end portions, a pair of rigid plates press-fitted on the sleeves and each engaging the outer faces of corresponding flanges, a pair of rubber blocks, each having a pair of tapered apertures whereby it is mounted on the corresponding tapered end portions of the sleeves, a bearing in each sleeve, annular rubber plugs inserted in the blocks and each closing the corresponding ends of a sleeve and bearing, a link pin passing through the bearing of each sleeve and through the plugs, links each having one end fixed to a link pin and means for detachably connecting the other ends of said links to link pins of adjacent sections.

2. A track for track-laying vehicles comprising articulated sections, each section consisting of a pair of sleeves, each sleeve having spaced flanges on its center portion and having tapered end portions, a pair of rigid plates press-fitted on the sleeves and each engaging the outer faces of corresponding flanges, a pair of rubber blocks, each mounted on the corresponding tapered end portions of the sleeves, a bearing in each sleeve, annular rubber plugs inserted in the blocks and each closing the corresponding ends of a sleeve and bearing, a link pin passing through the bearing of each sleeve and through the plugs, and links connecting the link pins of adjacent sections.

3. A track for track-laying vehicles comprising articulated sections, each section including a pair of sleeves having tapered end portions, a pair of spaced plates rigidly connecting the central portions of the sleeves, a pair of blocks, each mounted on the corresponding tapered end portions of the sleeves, a bearing in each sleeve, annular plugs inserted in the blocks and each closing the corresponding ends of a sleeve and bearing, a link pin passing through the bearing of each sleeve and through the plugs, and links connecting the link pins of adjacent sections.

4. A track for track-laying vehicles comprising articulated sections, each section including a pair of sleeves having tapered end portions, a pair of spaced plates rigidly connecting the central portions of the sleeves, a pair of blocks, each mounted on the corresponding tapered end portions of the sleeves, a bearing in each sleeve, a link pin passing through the bearing of each sleeve, and links connecting the link pins of adjacent sections.

5. A track for track-laying vehicles comprising articulated sections, each section including a pair of sleeves, a pair of spaced plates rigidly connecting the central portions of the sleeves, a pair of blocks, each mounted on the corresponding end portions of the sleeves, a bearing in each sleeve, annular plugs inserted in the blocks and each closing the corresponding ends of a sleeve and bearing, a link pin passing through the bearing of each sleeve and through the plugs, and links connecting the link pins of adjacent sections.

6. A track for track-laying vehicles comprising articulated sections, each section including a pair of sleeves, a pair of spaced plates rigidly connecting the central portions of the sleeves, a pair of blocks, each mounted on the corresponding end portions of the sleeves, a link pin passing through each sleeve, and links connecting the link pins of adjacent sections.

HARRY A. KNOX.
CHARLES HILLER, JR.